(12) United States Patent
Liu et al.

(10) Patent No.: US 6,288,901 B1
(45) Date of Patent: Sep. 11, 2001

(54) APPARATUS FOR MOUNTING A SWITCHING POWER SUPPLY TO A COMPUTER ENCLOSURE

(75) Inventors: Yu-Tai Liu, Hsin-Chuang; Alvin Liu, Pa-Li, both of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/405,284

(22) Filed: Sep. 23, 1999

(30) Foreign Application Priority Data

Oct. 9, 1998 (TW) .................................................. 87216767

(51) Int. Cl.⁷ ....................................................... G06F 1/16
(52) U.S. Cl. ........................ 361/724; 174/66; 248/222.11; 361/679
(58) Field of Search ..................................... 361/679, 683, 361/684, 685, 724, 725, 728, 729, 730; 248/27.1, 222.52, 223.21, 221.11; 312/223.1–223.3; 174/66

(56) References Cited

U.S. PATENT DOCUMENTS

| | | | |
|---|---|---|---|
| 3,316,452 | * | 4/1967 | Barlow . |
| 4,964,017 | * | 10/1990 | Jindrick et al. ...................... 361/390 |
| 5,076,461 | * | 12/1991 | Nichols . |
| 5,175,670 | * | 12/1992 | Wang ................................... 361/683 |
| 5,224,019 | * | 6/1993 | Wong et al. ......................... 361/683 |
| 5,561,893 | * | 10/1996 | Lee ........................................ 29/434 |
| 5,587,881 | * | 12/1996 | Wang ................................... 361/695 |
| 5,612,854 | * | 3/1997 | Wiscombe et al. .................. 361/727 |
| 5,673,174 | * | 9/1997 | Hamirani ............................. 361/686 |
| 5,690,306 | * | 11/1997 | Roesner ............................... 248/27.1 |

\* cited by examiner

*Primary Examiner*—Leo P. Picard
*Assistant Examiner*—Lisa Lea-Edmonds
(74) *Attorney, Agent, or Firm*—Wei Te Chung

(57) ABSTRACT

An apparatus for mounting a switching power supply to a rear panel having an opening defined therein of a computer enclosure, comprises a cover including a vertical portion fitted in the opening, and a step portion securely fixed to the rear panel. The vertical portion further includes a tab interengaged with the switching power supply.

2 Claims, 7 Drawing Sheets

APPARATUS FOR MOUNTING A SWITCHING POWER SUPPLY TO A COMPUTER ENCLOSURE

SPECIFICATION

BACKGROUND OF THE INVENTION

1. Field of The Invention

The present invention relates to a computer enclosure, and particularly to an apparatus for allowing a computer enclosure to mount a switching power supply in one of two different sizes.

2. The Related Art

A switching power supply in a computer system converts the locally supplied alternating current (AC) power (usually 100–250 V) to a direct current (DC) power at a low voltage usable by the computer. A switching power supply also distributes electrical power to the subsystems of the computer requiring different voltage levels, such as a CD-ROM drive, a floppy disk drive, a hard disk drive or a fan.

As shown in FIG. 1, a conventional computer enclosure 10 includes a rear panel 12 defining an opening 14 in an upper portion thereof for mounting a switching power supply 16 therein. The power supply 16 has a socket 18 and a plurality of ventilation holes 20 exposed to the opening 14. Several holes 22 are defined proximate the opening 14 and are aligned with corresponding holes 24 of the power supply 16 for fixing the power supply 16 to the computer enclosure 10. A supporting bracket 26 extending from an edge of the opening 14 supports the power supply 16. However, the conventional computer enclosure 10 can only accommodate a power supply of one predetermined size. Another power supply having different dimensions can not be mounted to the computer enclosure 10.

Conventional computer enclosures, such as the one shown in FIG. 1, can only mount one size of power supply therein. Situations requiring a different sized power supply require a different computer enclosure, which in turn requires different molds and tooling for each enclosure, increasing the cost per enclosure. Therefore, a computer enclosure, which can mount a range of different power supplies by means of a small modification of the enclosure is desired.

SUMMARY OF THE INVENTION

An object of the present invention is to provide a computer enclosure that can mount a power supply in a range of different sizes.

Another object of the present invention is to provide a cover for use in mounting a power supply to a computer enclosure.

The present invention discloses a computer enclosure which can mount a switching power supply of one of two different sizes. The computer enclosure includes a rear panel having an opening sized to mount a first power supply having a larger size, plus a cover covering a part of the opening for mounting a second power supply having a smaller size.

DETAILED DESCRIPTION OF THE PREFERRED EMBODIMENTS

The invention can be used with different computer systems, such as a personal computers, workstations, or servers. For purposes of illustration, the embodiments are shown with personal computers in which a switching power supply of one of two different sizes is to be mounted.

Figure 1:
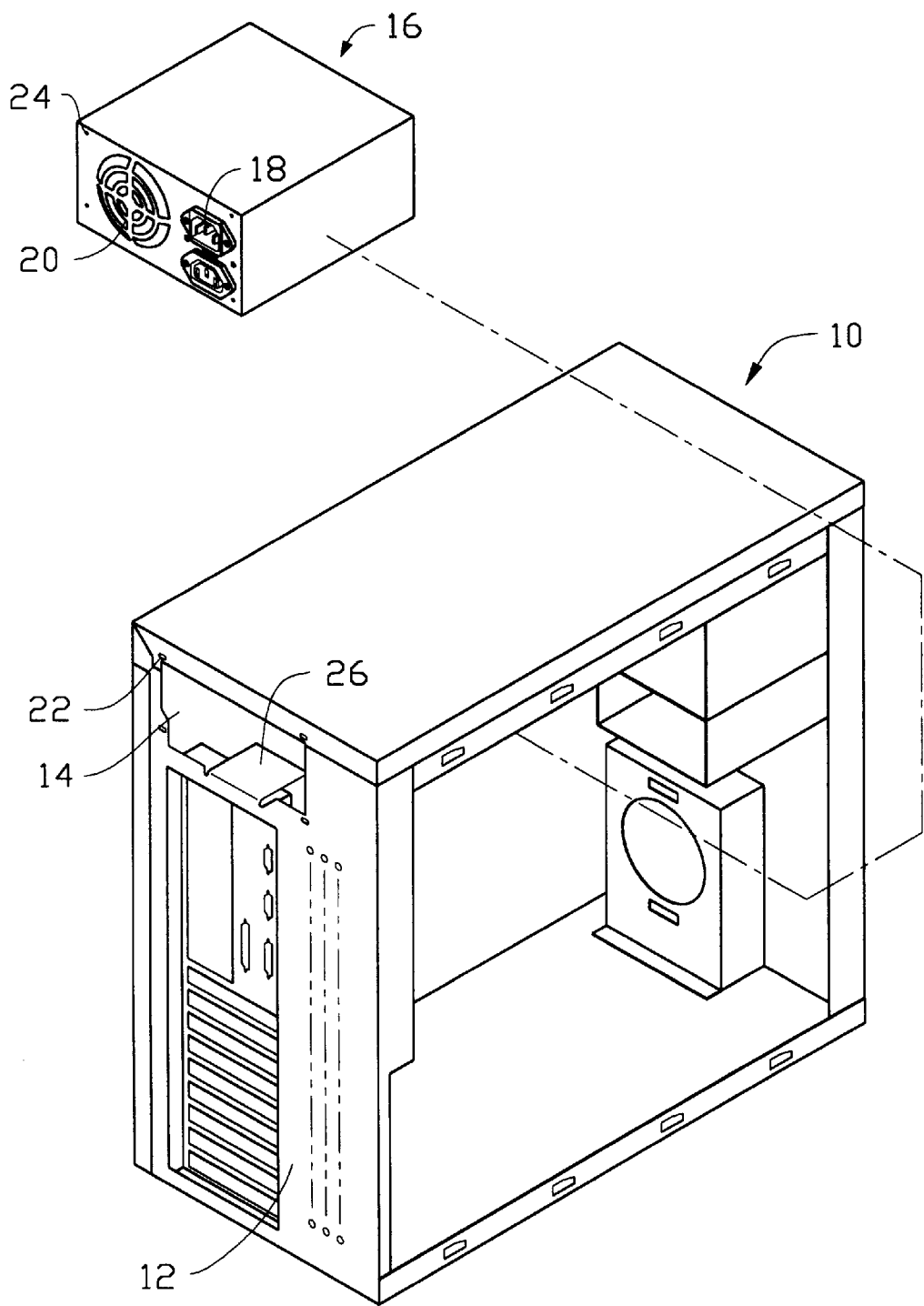
FIG. 1 is a perspective view of a conventional computer enclosure.
Figure 2:
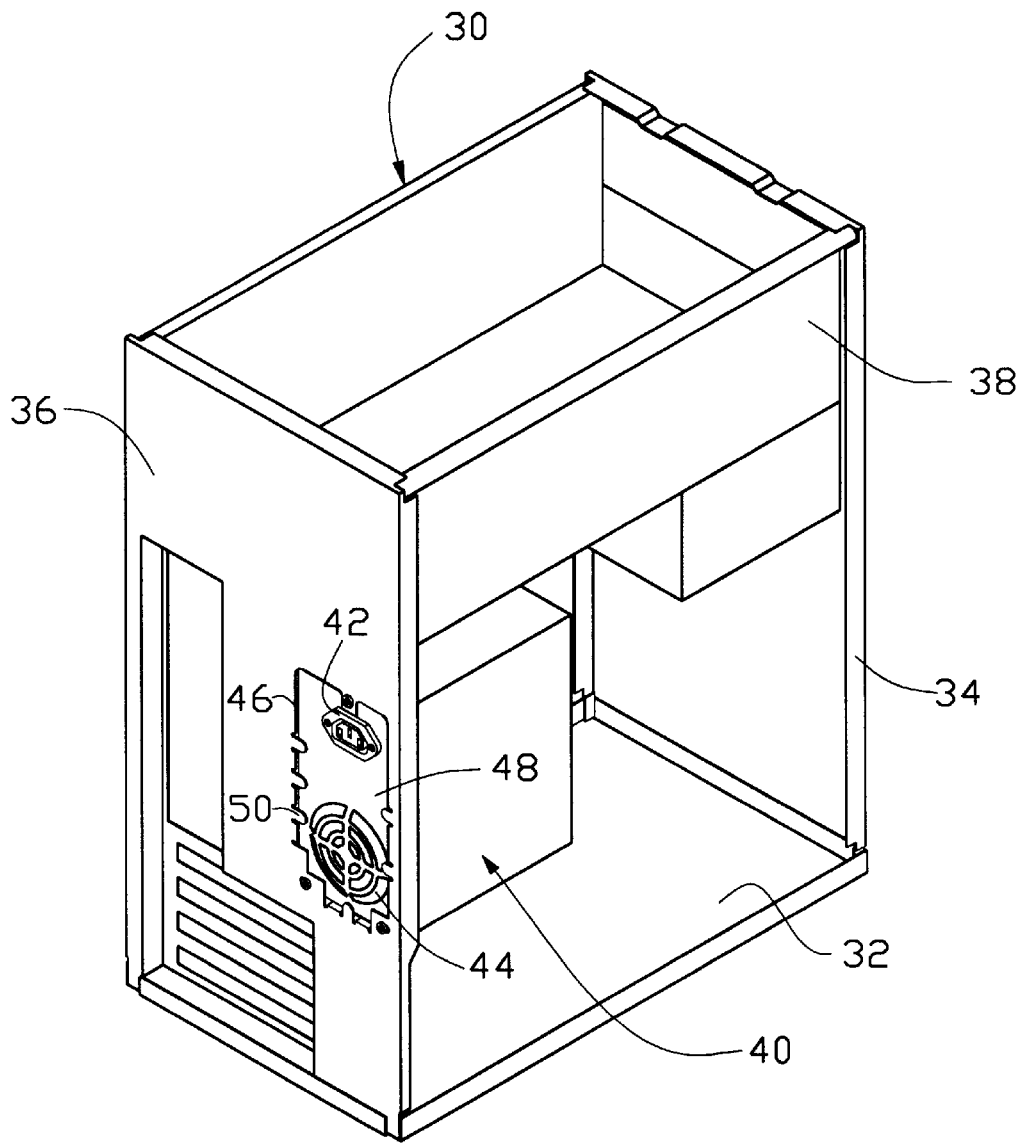
FIG. 2 is a perspective view showing a first switching power supply mounted to a computer enclosure in accordance with the present invention.

Referring to FIG. 2, a computer enclosure 30 includes a base panel 32, a front panel 34, a rear panel 36 and a drive cage 38 bridging between the front panel 34 and the rear panel 36. A first switching power supply 40 of a relatively large size is mounted in the enclosure 30 beneath the drive cage 38 and has a power socket 42 and curved ventilation holes 44 exposed to an opening 46 for connection with a local power source and for heat dispersion. The mating face 48 of the first switching power supply 40 is big enough to cover the whole opening 46. Grounding fingers 50 extending from the edges of the opening 46 contact the mating face 48 to ground the first switching power supply 40 to the enclosure 30.

Figure 3:
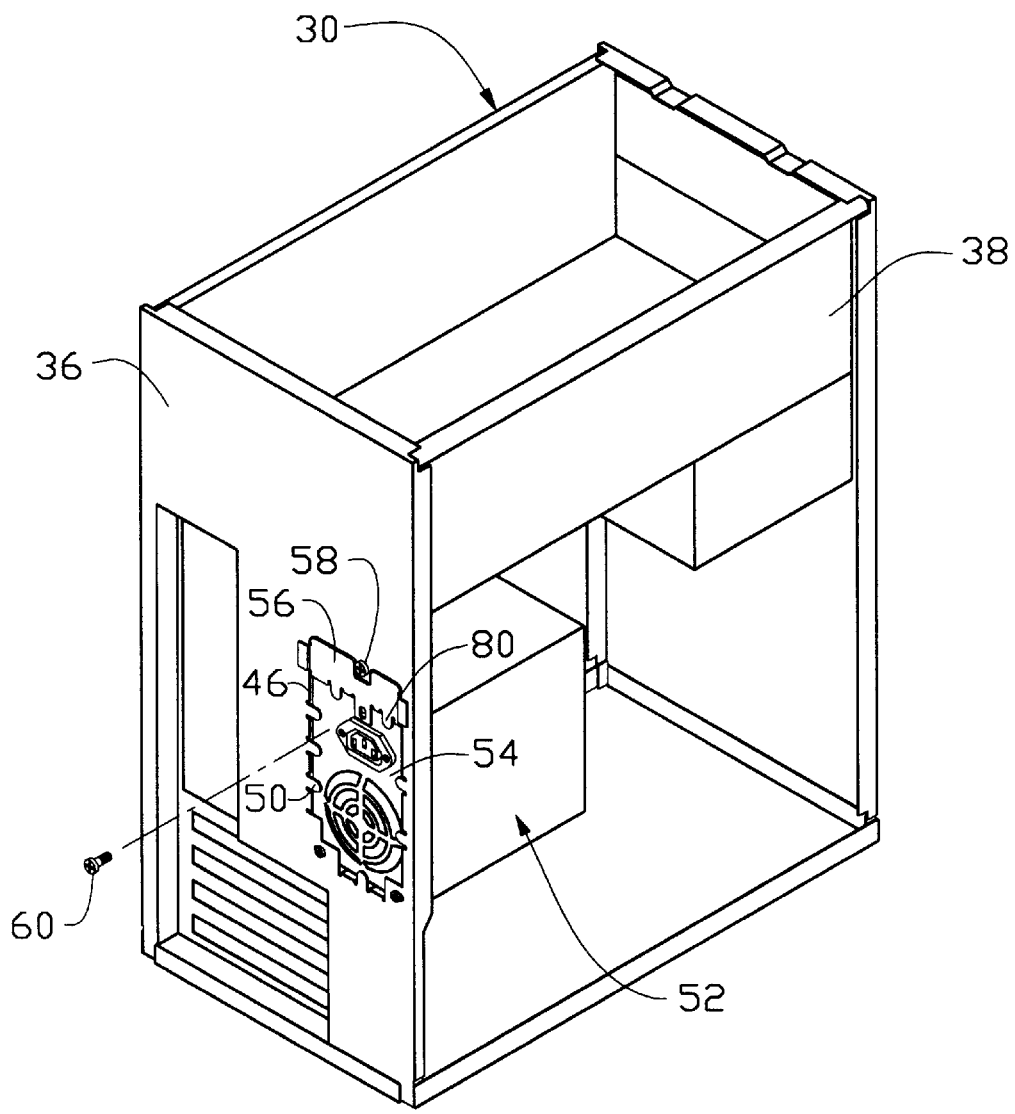
FIG. 3 is a perspective view showing a second switching power supply mounted to the computer enclosure in accordance with the present invention.

Referring to FIG. 3, a second switching power supply 52 with a smaller size is mounted in the computer enclosure 30. The second switching power supply 52 has a smaller mating face 54 than the first switching power supply 40 has, and therefore the mating face 54 does not block the entire opening 46 like the mating face 48 of the first switching power supply 40 does. A cover 56 is secured to the rear panel by a screw 58 which covers the portion of the opening 46 not covered by the power supply 52. The switching power supply 52 is fixed to the cover 56 and the rear panel 36 by screws 60.

Figure 4:
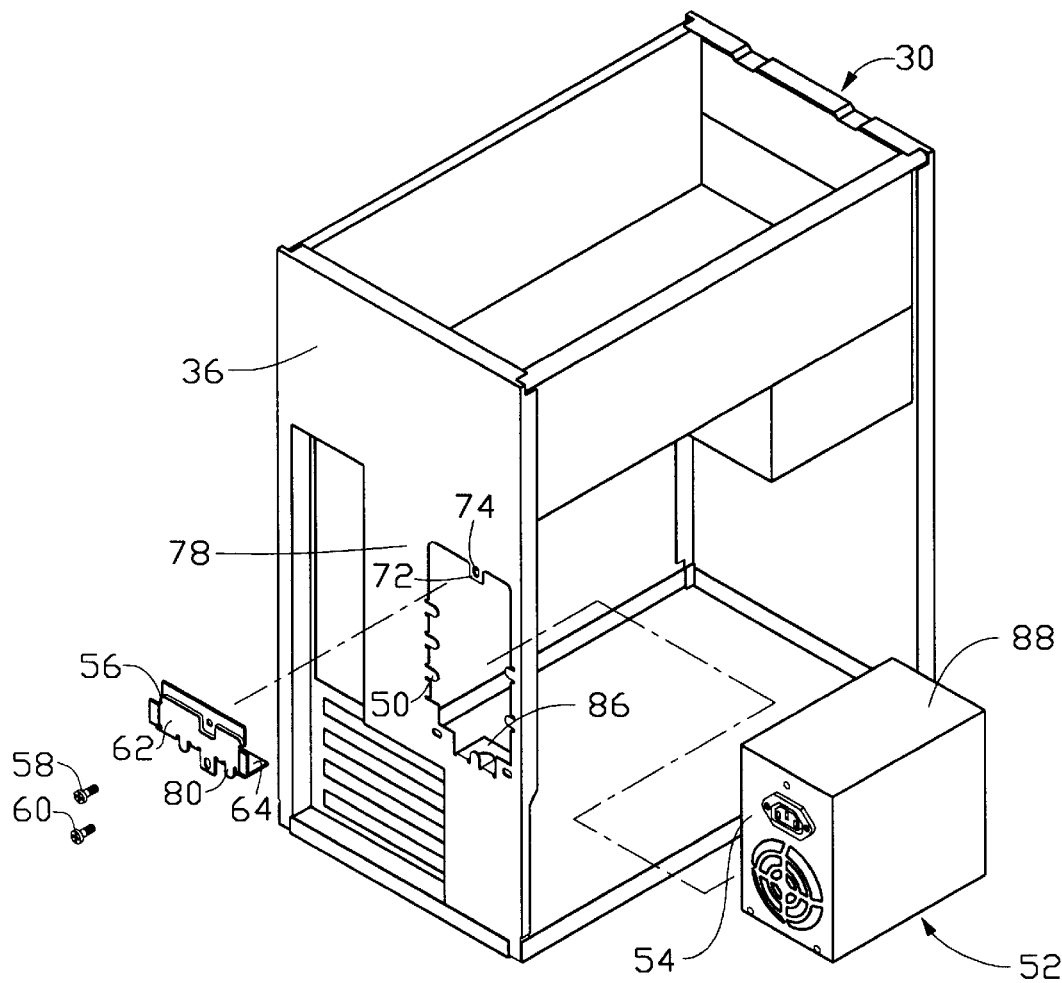
FIG. 4 is an exploded view showing the computer enclosure, the second switching power supply and a cover in accordance with the present invention.
Figure 5:
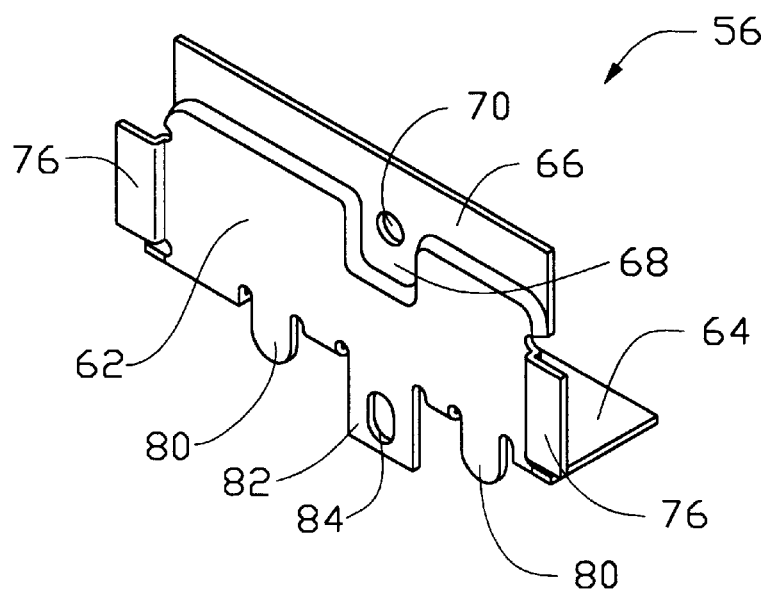
FIG. 5 is a perspective view showing the cover in accordance with the present invention.

As shown in FIGS. 4 and 5, the cover 56 includes a vertical portion 62 and a horizontal portion 64. A step portion 66 is defined along an upper side of the vertical portion 62, the step portion 66 extending downward to define a bay zone 68 for accommodating a tab 72 extending from an upper edge of the opening 46. The bay zone 68 and the tab 72 respectively define a hole 70 and a second hole 74, which align with one another. The cover 56 further forms a pair of stoppers 76 projecting forwardly and extending outwardly from opposite sides of the vertical portion 62 for abutting an exterior surface 78 of the rear panel 36 around the opening 46. In the lower portion of the vertical portion 62, the cover 56 forms two grounding fingers 80 and a tab 82 defining a hole 84 for respectively contacting the mating face 54 of the switching power supply 52 and for securing the switching power supply 52 thereto.

Figure 6:
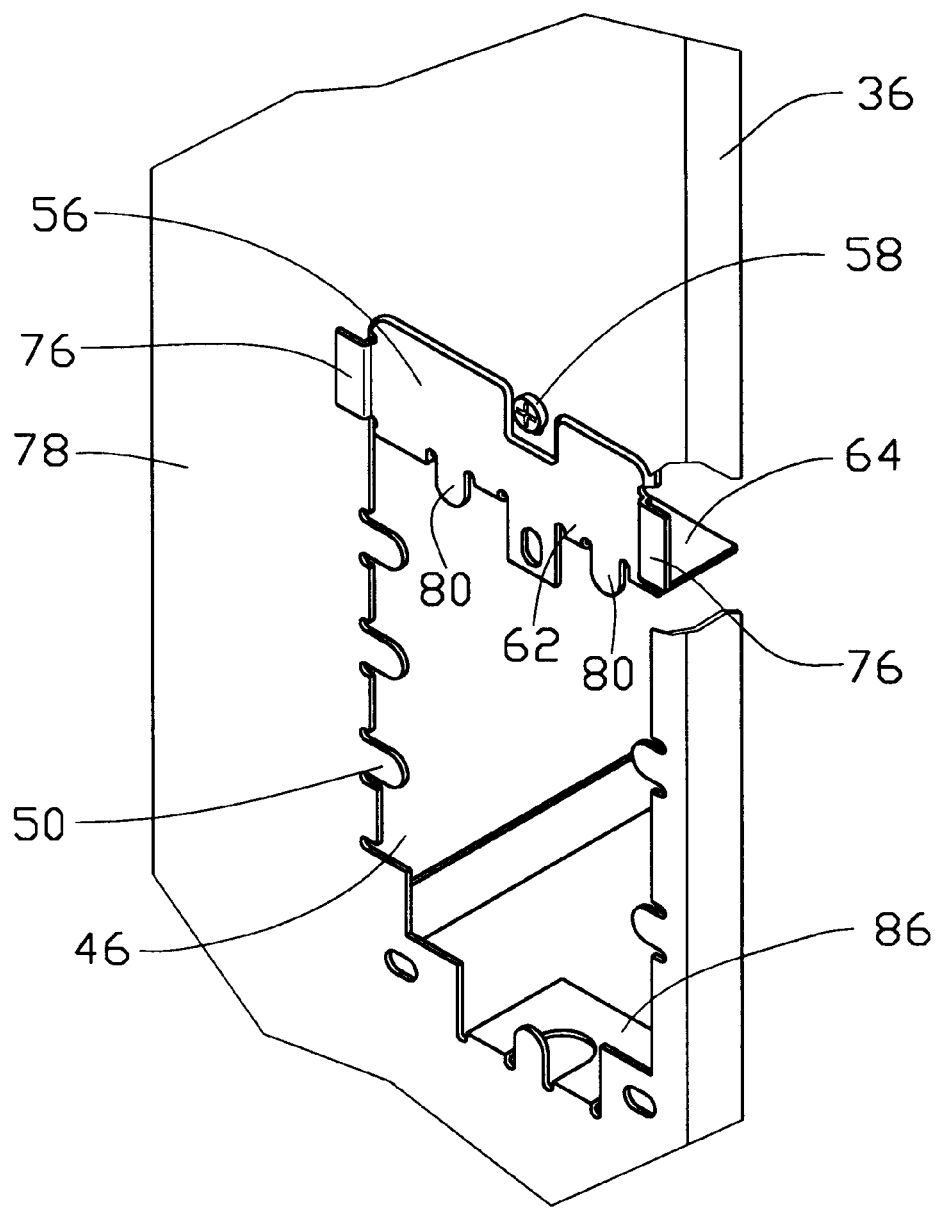
FIG. 6 is a partial perspective view showing the cover mounted to the computer enclosure.

In assembly, the cover 56 is mounted to the opening 46 as shown in FIG. 6. The step portion 66 of the cover 56 is positioned behind the rear panel 36. The stoppers 76 abut the exterior surface 78 of the rear panel 36. A screw 58 extends through the aligned holes 70, 74 in the bay zone 68 and on the tab 40, respectively, fixing the cover 56 to the rear panel 36. Referring to FIGS. 3, 4 and 6 together, a stage 86 protrudes inward from a lower edge of the opening 46 for supporting the switching power supply 52. The switching power supply 52 is secured to the cover 56 and to the rear panel 36 using the screws 60. The horizontal portion 64 of the cover 56 contacts an upper face 88 of the switching power supply 52. The grounding fingers 50 of the rear panel 36 and the grounding fingers 80 contact the mating face 54 of the switching power supply 52 to ground the power supply 52 to the enclosure 30.

Figure 7:
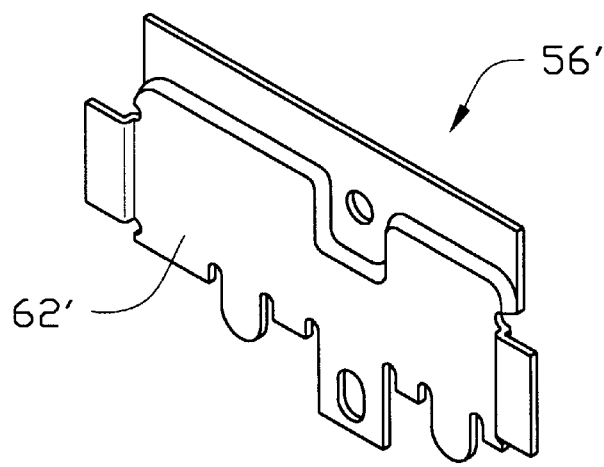
FIG. 7 is a perspective view showing a cover of a second embodiment in accordance with the present invention.
Figure 8:
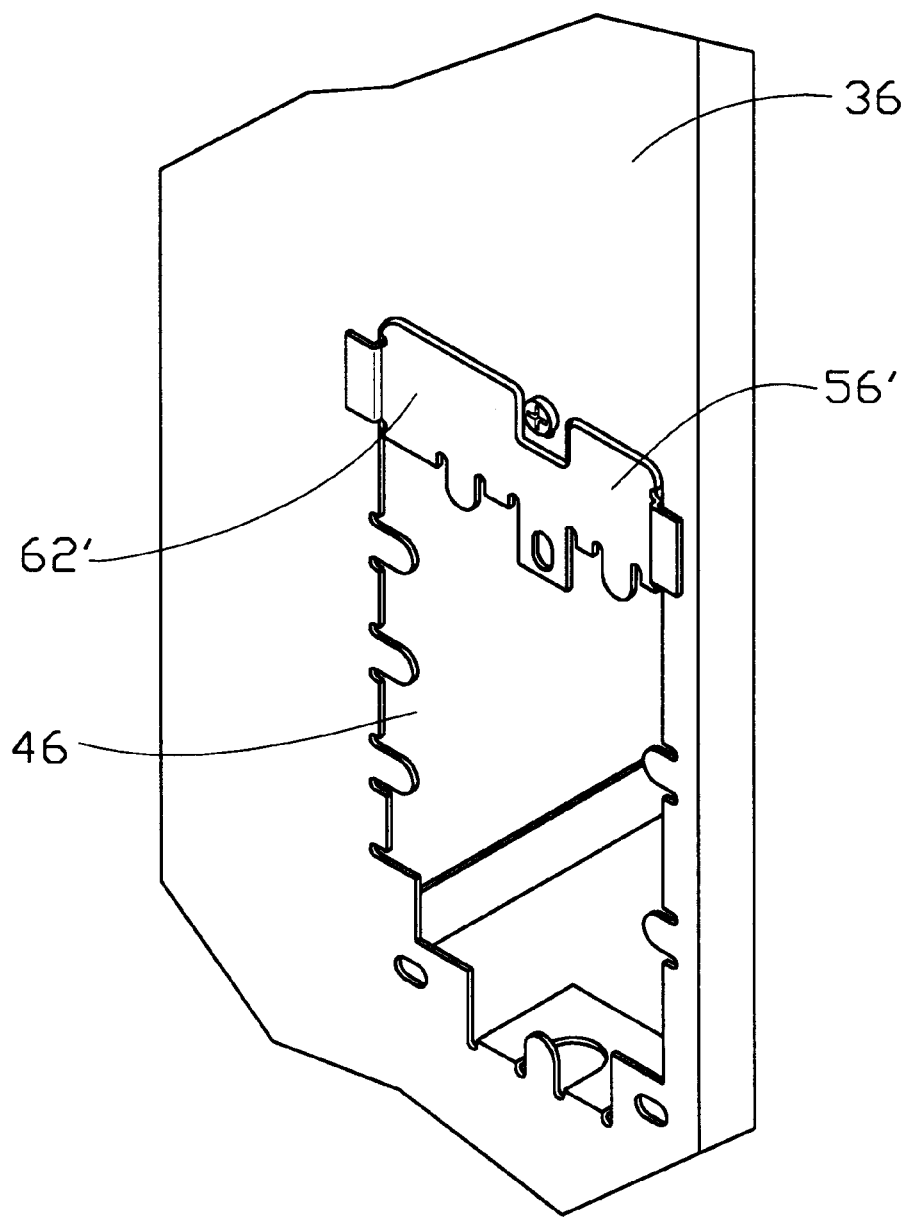
FIG. 8 is a partial perspective view showing the cover of the second embodiment mounted to the computer enclosure.

A second embodiment of the invention is shown in FIGS. 7 and 8. A cover 56' of the second embodiment only has a vertical portion 62', not the horizontal portion described in the first embodiment.

While the present invention has been described in reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, persons of ordinary skill in this field are to understand that all such equivalent structures are to be included within the scope of the following claims.

We claim:

1. An apparatus for mounting a switching power supply to a rear panel having an opening defined therein of a computer enclosure, comprising:

a cover including a vertical portion fitted in said opening, and a step portion securely fixed to the rear panel, said vertical portion further including a tab interengaged with said switching power supply and stoppers along two sides thereof for abutting against said rear panel and counter-balancing said step portion.

2. A computer assembly comprising:

a computer enclosure including a rear panel with therein an opening adapted to compliantly mount a larger switching power supply thereto;

a cover fixed to said rear panel and occupying a portion of the opening; and a smaller switching power supply fixed to both said rear panel and said cover, and occupying the remaining portion of said opening.

* * * * *